(12) United States Patent
Kumeta et al.

(10) Patent No.: US 11,613,664 B2
(45) Date of Patent: *Mar. 28, 2023

(54) AQUEOUS INK JET INK COMPOSITION AND INK JET PRINTING METHOD

(71) Applicant: Seiko Epson Corporation, Tokyo (JP)

(72) Inventors: Hiroaki Kumeta, Matsumoto (JP); Soichi Yamazaki, Shiojiri (JP); Manabu Taniguchi, Shiojiri (JP); Shunsuke Uchizono, Shiojiri (JP)

(73) Assignee: SEIKO EPSON CORPORATION

( * ) Notice: Subject to any disclaimer, the term of this patent is extended or adjusted under 35 U.S.C. 154(b) by 307 days.

This patent is subject to a terminal disclaimer.

(21) Appl. No.: 16/857,214

(22) Filed: Apr. 24, 2020

(65) Prior Publication Data

US 2020/0339829 A1    Oct. 29, 2020

(30) Foreign Application Priority Data

Apr. 25, 2019 (JP) .............................. JP2019-083763

(51) Int. Cl.
  *C09D 11/322*  (2014.01)
  *C01B 33/12*   (2006.01)
  *C09D 11/38*   (2014.01)

(52) U.S. Cl.
  CPC ............ *C09D 11/322* (2013.01); *C01B 33/12* (2013.01); *C09D 11/38* (2013.01); *C01P 2004/51* (2013.01)

(58) Field of Classification Search
  CPC ..... C09D 11/322; C09D 11/38; C09D 11/033; C09D 11/037; C01B 33/12; C01P 2004/51; B41M 5/0023; B41J 2/01; B41J 2/2107
  See application file for complete search history.

(56) References Cited

U.S. PATENT DOCUMENTS

| | | | |
|---|---|---|---|
| 5,925,178 A | 7/1999 | Martin et al. | |
| 5,972,087 A | 10/1999 | Uraki et al. | |
| 6,039,796 A | 3/2000 | Kubota et al. | |
| 8,404,761 B2 | 3/2013 | Shinozaki et al. | |
| 8,460,450 B2 | 6/2013 | Taverizatshy et al. | |
| 9,221,253 B2 | 12/2015 | Suzuki et al. | |
| 11,193,032 B2 * | 12/2021 | Kumeta | B41M 5/0023 |
| 2004/0127619 A1 | 7/2004 | Sun et al. | |
| 2010/0003407 A1 | 1/2010 | Ito | |
| 2013/0050355 A1 * | 2/2013 | Imamura | C09D 11/54 524/90 |
| 2013/0224451 A1 | 8/2013 | Shiono et al. | |
| 2016/0102218 A1 | 4/2016 | Liu et al. | |
| 2017/0292036 A1 | 10/2017 | Shimamura | |
| 2018/0079921 A1 | 3/2018 | Okamoto et al. | |
| 2018/0273787 A1 | 9/2018 | Herlihy et al. | |
| 2018/0273788 A1 | 9/2018 | Ito | |
| 2018/0291220 A1 | 10/2018 | Ito | |
| 2018/0346745 A1 | 12/2018 | Ito | |
| 2019/0040272 A1 | 2/2019 | Ito | |
| 2019/0270902 A1 | 9/2019 | Shimamura | |

FOREIGN PATENT DOCUMENTS

| | | |
|---|---|---|
| CN | 103289470 A | 9/2013 |
| EP | 2327746 B1 | 2/2013 |
| JP | H10-060342 A | 3/1998 |
| JP | H11-012516 A | 1/1999 |
| JP | 2000-053901 A | 2/2000 |
| JP | 2002-029140 A | 1/2002 |
| JP | 2002-206063 A | 7/2002 |
| JP | 2008-038090 A | 2/2008 |
| JP | 2008-201840 A | 9/2008 |
| JP | 2010-510357 A | 4/2010 |
| JP | 2010-174100 A | 8/2010 |
| JP | 2011-057916 A | 3/2011 |
| JP | 2011-062999 A | 3/2011 |
| JP | 2011-111527 A | 6/2011 |
| JP | 2013-181055 A | 9/2013 |
| JP | 2015-110291 A | 6/2015 |
| WO | 2016-035787 A1 | 3/2016 |

* cited by examiner

*Primary Examiner* — An H Do
(74) *Attorney, Agent, or Firm* — Harness, Dickey & Pierce, P.L.C.

(57) ABSTRACT

An aqueous ink jet ink composition contains pigment particles, inorganic oxide particles, and resin particles. The content of the inorganic oxide particles is 1.0% to 10.0% relative to the total mass of the ink composition. The ink composition satisfies the following relationship:

$D_{50}$ of the resin particles $\leq D_{50}$ of the inorganic oxide particles $\leq D_{50}$ of the pigment particles, wherein $D_{50}$ represents the volume median diameter of the corresponding particles.

9 Claims, No Drawings

AQUEOUS INK JET INK COMPOSITION AND INK JET PRINTING METHOD

The present application is based on, and claims priority from JP Application Serial Number 2019-083763, filed Apr. 25, 2019, the disclosure of which is hereby incorporated by reference herein in its entirety.

BACKGROUND

1. Technical Field

The present disclosure relates to an aqueous ink jet ink composition and an ink jet printing method.

2. Related Art

An ink jet printing method is a technique of printing performed by ejecting small ink droplets onto a printing medium, such as a paper sheet, from an ink jet head. The ink jet printing method is being innovatively developed and is accordingly being used for high-resolution image printing, which has been performed in the fields of photo printing and offset printing. For example, JP-T-2010-510357 discloses an ink composition containing silica fine particles and latex fine particles.

One approach to improving the image quality of printed items is to increase the color developability of ink compositions. An increase in the color developability of an ink composition may minimize the environmental impact from the ink composition. More specifically, an ink composition having a high color developability can provide a high optical density for the printed item even if the application amount of the ink composition is small, consequently resulting in a reduced amount of the ink composition used. It has been found that an ink composition containing a pigment and inorganic oxide particles whose particle sizes have a specific relationship has a high color developability. Although the ink composition disclosed in JP-T-2010-510357 contains silica particles, the ink composition is intended to form a dry film on a printed circuit board, and there is no statement about improving color developability. Hence, this cited ink composition has an issue in terms of improving color developability.

The present inventors found through their study that characters or graphics printed on a printing medium with ink compositions containing inorganic oxide particles bleed when marked with a marker pen. Thus, ink compositions containing inorganic oxide particles have a disadvantage with fixability, particularly, resistance to rubbing with a marker pen (resistance to marker rubbing).

SUMMARY

The present inventors conducted intensive research to solve the above issues and found that the following ink composition can provide a high resistance to marker rubbing while exhibiting high color developability. The ink composition contains pigment particles, inorganic oxide particles with a content in a specific range, and resin particles, and in which the volume median diameters $D_{50}$'s of these particles satisfy the following specific relationship.

Accordingly, the present disclosure provides an aqueous ink jet ink composition containing pigment particles, inorganic oxide particles with a content of 1.0% to 10.0% relative to the total mass of the ink composition, and resin particles, and satisfying the following relationship:

$D_{50}$ of the resin particles≤$D_{50}$ of the inorganic oxide particles≤$D_{50}$ of the pigment particles wherein $D_{50}$ represents the volume median diameter of the corresponding particles.

The present disclosure is also directed to an ink jet printing method including an ink application step of applying the above-described ink composition onto a printing medium by ejecting the ink composition from an ink jet head. In the ink application step, the ink composition may be ejected at an application amount of 3.6 mg/inch² or more.

The $D_{50}$ of the inorganic oxide particles may be 11 nm to 100 nm. The inorganic oxide particles may be silica particles. The resin particles may have a minimum film forming temperature of 25° C. or less. The $D_{50}$ of the resin particles may be 10 nm to 140 nm. The content of the resin particles may be 0.1% to 5.0% relative to the total mass of the ink composition.

DESCRIPTION OF EXEMPLARY EMBODIMENTS

Some embodiments of the subject matter of the present disclosure will now be described. However, the implementation of the subject matter is not limited to the disclosed embodiments, and various modifications may be made without departing from the scope and spirit of the present disclosure.

Aqueous Ink Jet Ink Composition

The aqueous ink jet ink composition (hereinafter simply referred to as the ink composition) disclosed herein contains pigment particles, inorganic oxide particles, and resin particles. The content of the inorganic oxide particles is 1.0% to 10.0% relative to the total mass of the ink composition, and the constituent particles satisfy the following relationship (1):

$D_{50}$ of the resin particles≤$D_{50}$ of the inorganic oxide particles≤$D_{50}$ of the pigment particles    (1)

wherein $D_{50}$ represents the volume median diameter of the corresponding particles.

Such an ink composition can provide a high resistance to marker rubbing while exhibiting high color developability.

The term "aqueous ink jet ink composition" used herein refers to an ink composition containing 30% or more of water relative to the total mass of the ink composition.

Relationship (1)

The constituent particles in the ink composition satisfy the following relationship (1):

$D_{50}$ of the resin particles ≤$D_{50}$ of the inorganic oxide particles ≤$D_{50}$ of the pigment particles, wherein $D_{50}$ represents the volume median diameter of the corresponding particles.

The ink composition satisfying relationship (1) can provides a high resistance to marker rubbing while exhibiting high color developability. Probably, the inorganic oxide particles in the ink composition applied onto a printing medium act to retain the pigment particles on the surface of the printing medium. Consequently, the ink composition produces high color development. In addition, it has been found that the resin particles in the ink composition under the condition satisfying relationship (1) enhances the resistance to marker rubbing.

In some embodiments, the constituent particles of ink composition may satisfy the following relationship (1H-1), (1H-2), or (1H-3) to enhance the resistance to marker rubbing of the ink composition.

$$D_{50} \text{ of the inorganic oxide particles} \leq D_{50} \text{ of the pigment particles} \times 0.9 \quad (1H\text{-}1)$$

$$D_{50} \text{ of the inorganic oxide particles} \leq D_{50} \text{ of the pigment particles} \times 0.8 \quad (1H\text{-}2)$$

$$D_{50} \text{ of the inorganic oxide particles} \leq D_{50} \text{ of the pigment particles} \times 0.5 \quad (1H\text{-}3)$$

The ink composition can reduce the wet friction of printed items, provided that the ink composition contains 1.0% by mass or more of inorganic oxide particles. From the viewpoint of further reducing the wet friction, the ink composition may satisfy the following relationship (2):

$$D_{50} \text{ of pigment particles} \times 0.1 \leq D_{50} \text{ of inorganic oxide particles} \quad (2)$$

When this relationship holds true, the wet friction of the items printed with the ink composition can be low, and the printed items can be neatly and smoothly stacked when put on the print side of another printed item.

The term volume median diameter, represented by $D_{50}$, used herein is the value at 50% by volume in a cumulative particle size distribution measured by a dynamic light scattering method. For example, the $D_{50}$ of a material can be determined by measuring the material diluted to 200 times with pure water with a Zeta-potential & Particle Size Analyzer ELSZ-1000ZS (manufactured by Otsuka Electronics).

Inorganic Oxide Particles

In the ink composition disclosed herein, the content of the inorganic oxide particles is 1.0% to 10.0% relative to the total mass of the ink composition. When the content of the inorganic oxide particles is in this range, the ink composition can provide a low wet friction and a high resistance to marker rubbing for the printed item while exhibiting high color developability.

In some embodiments, the content of the inorganic oxide particles may be 3.0% or more, for example, 5.0% or more or 6.0% or more, relative to the total mass of the ink composition. The ink composition containing inorganic oxide particles with such a content exhibits a high color developability and provides a low wet friction for the printed item. Also, the content of the inorganic oxide particles may be 9.0% or less, for example, 8.5% or less or 8.0% or less, relative to the total mass of the ink composition. Such an ink composition enables satisfactory recovery from clogging.

Examples of the inorganic oxide particles include, but are not limited to, particles of silica, alumina, titania, zirconia, antimony oxide, tin oxide, tantalum oxide, zinc oxide, cerium oxide, lead oxide, and indium oxide. The inorganic oxide particles may be one kind of inorganic oxide particles or a combination of two or more kinds of inorganic oxide particles. In some embodiments, silica particles or alumina particles may be used, and silica particles may be more beneficial.

An inorganic oxide sol, such as, but not limited to, silica sol, may be added as the inorganic oxide particles into the ink composition. Silica sol is commercially available, and examples thereof include, but are not limited to, SI-550, SI-30P, SI-45P, and SI-80P (all produced by JGC Catalysts & Chemicals); and ST-CM, ST-ZL, ST-30L, and MP-1040 (all produced by Nissan Chemical Industries).

The $D_{50}$ of the inorganic oxide particles may be 11 nm to 100 nm. In some embodiments, the $D_{50}$ of the inorganic oxide particles may be 15 nm or more, for example, 20 nm or more or 30 nm or more. Also, the $D_{50}$ of the inorganic oxide particles may be 100 nm or less, for example, 90 nm or less or 80 nm or less. The ink composition containing such inorganic oxide particles can exhibit a higher color developability.

Pigment Particles

A pigment particle is a particle containing a pigment. The pigment may be chromatic, black, or white or have a fluorescent color. Also, the Pigment may be inorganic or organic. Examples of the pigment used in the ink composition disclosed herein are as follows:

Carbon black may be used in a black ink, and examples thereof include, but are not limited to, No. 2300, No. 900, MCF88, No. 33, No. 40, No. 45, No. 52, MA7, MA8, MA100, and No. 2200B (all produced by Mitsubishi Chemical); Raven series 5750, 5250, 5000, 3500, 1255, and 700 (all produced by Columbia Carbon); Regal series 400R, 330R, and 660R (all produced by Cabot); Mogul L (produced by Cabot); Monarch series 700, 800, 880, 900, 1000, 1100, 1300, and 1400 (all produced by Cabot); Color Black series FW1, FW2, FW2V, FW18, FW200, 5150, 5160, and 5170 (all produced by Degussa); Printex series 35, U, V, and 140U (all produced by Degussa); and Special Black series 6, 5, 4A, and 4 (all produced by Degussa).

Examples of the pigments used in a white ink include, but are not limited to, C.I. Pigment Whites 6, 18, and 21, titanium oxide, zinc oxide, zinc sulfide, antimony oxide, zirconium oxide, and white hollow resin particles, and polymer particles.

Examples of the pigment used in a yellow ink include, but are not limited to, C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in a magenta ink include, but are not limited to, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violets 19, 23, 32, 33, 36, 38, 43, and 50.

Examples of the pigment used in a cyan ink include, but are not limited to, C.I. Pigment Blues 1, 2, 3, 15, 15:1, 15:2, 15:3, 15:34, 15:4, 16, 18, 22, 25, 60, 65, and 66; and C.I. Vat Blues 4 and 60.

Other pigments may be used, and examples thereof include, but are not limited to, C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

The pigment used in the ink composition may be self-dispersible. Self-dispersible pigments have a hydrophilic group. The hydrophilic group may be, but is not limited to, —OM, —COOM, —CO—, —$SO_3M$, —$SO_2M$, —$SO_2NH_2$, —$RSO_2M$, —$PO_3HM$, —$PO_3M_2$, —$SO_2NHCOR$, —$NH_3$, or —$NR_3$. M's in some of the above-cited groups each independently represent a hydrogen atom, an alkali metal, ammonium, a substituted or unsubstituted phenyl group, or an organic ammonium, and R's each independently represent an alkyl group having a carbon number of 1 to 12 or a substituted or unsubstituted naphthyl group.

The self-dispersible pigment is produced by, for example, binding any of the above-cited hydrophilic groups to a pigment. For binding the hydrophilic group to a pigment, the pigment may be subjected to, for example, vacuum plasma treatment, ozone oxidation, phosphoric acid treatment, or wet oxidation with an oxidizing agent in water, or p-aminobenzoic acid may be bound to the surfaces of the pigment particles to bind the carboxy group to the surfaces with the phenyl group therebetween. The technique for binding is not limited to these techniques. In some embodiments, carbon black treated by ozone oxidation or phosphorylation may be used as the pigment, and carbon black subjected to ozone oxidation may be beneficially used.

Some self-dispersible pigments are commercially available, and examples thereof include Aqua-Black 162 (produced by Tokai Carbon), Microjet CW-1 (produced by Orient Chemical Industries), and CAB-O-JET (registered trademark) series 200, 300, and 450C (all produced by CABOT).

Such pigments may be used singly or individually as the pigment particles.

The $D_{50}$ of the pigment particles may be 10 nm to 300 nm. The ink composition containing such pigment particles exhibits a higher color developability, provides a low wet friction for the printed items, and enables satisfactory recovery from clogging. In some embodiments, the $D_{50}$ of the pigment particles may be 24 nm or more, for example, 40 nm or more or 65 nm or more. Also, the $D_{50}$ of the Pigment particles may be 200 nm or less, for example, 150 nm or less or 110 nm or less.

The content of the pigment particles may be 1.0% to 20.0% relative to the total mass of the ink composition. Such an ink composition exhibits a higher color developability, provides a low wet friction for the printed item, and enables satisfactory recovery from clogging. In some embodiments, the content of the pigment particles in the ink composition may be 3.0% or more, for example, 5.0% or more, relative to the total mass of the ink composition. Also, the content of the pigment particles may be 15.0% or less, for example, 10.0% or less, relative to the total mass of the ink composition.

Resin Particles

The ink composition contains resin particles. The resin particles in the ink composition act to enhance the resistance to marker rubbing.

The resin material of the resin particles may be, but is not limited to, urethane resin, acrylic resin, or styrene-acrylic resin.

Urethane resin has a urethane bond in the molecule thereof. The urethane resin used in the ink composition may be, but is not limited to, a polyether-type urethane resin having an ether bond in the main chain in addition to the urethane bond, a polyester-type urethane resin having an ester bond in the main chain in addition to the urethane bond, or a polycarbonate-type urethane resin having a carbonate linkage in the main chain in addition to the urethane bond.

The resin of the resin particles may be a self-reactive urethane resin or a self-reactive acrylic resin. Such a self-reactive resin may be a urethane resin blocked with a blocking agent having a hydrophilic group, a urethane resin blocked with a blocking agent having a hydrophilic segment, or an acrylic resin produced by copolymerization of one or more acrylic monomers having a functional group, such as carboxy, hydroxy, amino, or methylol.

Urethane resin particles may be in the form of emulsion, and urethane resin emulsions are commercially available. Examples thereof include, but are not limited to, SANCURE 2710 (produced by Lubrizol), PERMARIN UA-150 (produced by Sanyo Chemical Industries), Superflex series 150, 420, 460, 470, 610, and 700 (all produced by Dai-ichi Kogyo Seiyaku), NeoRez series R-9660, R-9637, and R-940 (all produced by Kusumoto Chemicals), ADEKA Bon-Tighter series HUX-380 and HUX-290K (both produced by ADEKA), and Takelac series W-605, W-635, and WS-6021 (all produced by Mitsui Chemicals).

Acrylic resin and styrene-acrylic resin are also commercially available, and examples thereof include, but are not limited to, Mowinyl series 966A and 320 (both produced by Nippon Synthetic Chemical Industry), Microgel series E-1002 and E-5002 (both produced by Nippon Paint), VONCOAT series 4001 and 5454 (both produced by DIC), SAE 1014 (produced by Zeon Corporation), Saivinol SK-200 (produced by Saiden Chemical Industry), JONCRYL series 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (all produced by BASF), NK Binder R-5HN (produced by Shin-Nakamura Chemical), and Paraloid B60 (produced by Rohm and Haas Company).

The $D_{50}$ of the resin particles may be 10 nm to 140 nm. The ink composition containing such pigment particles can exhibit higher color developability and provide a lower wet friction and a higher resistance to marker rubbing for the printed item. In some embodiments, the $D_{50}$ of the resin particles may be 100 nm or less, for example, 40 nm or less. When the $D_{50}$ of the resin particles is 100 nm or less, the ink composition can provide a much higher resistance to marker rubbing.

The minimum film forming temperature (MFT) of the resin particles may be 45° C. or less, for example, 30° C. or less or 25° C. or less. In some embodiments, the MFT may be 23° C. or less or 20° C. or less. Resin particles having an MFT in such a range are likely to form a coating at the surface of the printed item. Accordingly, items printed with the ink composition containing such resin particles are resistant to marker rubbing. The MFT of the resin particles may be, but is not limited to, 0° C. or more or 5° C. or more.

The MFT can be measured as described below. First, an emulsion of resin particles is applied to form a coating to a thickness of 0.3 mm on a stainless steel plate of thermal gradient tester. Immediately after the emulsion application, a basket containing silica gel was placed on the stainless steel plate, and the plate is covered with a transparent plastic cover. After the coating is dried, the temperature at a boundary between the uniform continuous portion and the clouded portion of the coating is measured as the minimum film forming temperature or MFT.

The content of the resin particles may be 0.1% to 20.0% relative to the total mass of the ink composition. Such an ink composition provides a still higher resistance to marker rubbing for the printed item. In some embodiments, the content of the resin particles in the ink composition may be 0.5% or more, for example, 1.0% or more, relative to the total mass of the ink composition. Also, the content of the resin particles may be 15.0% or less, for example, 10.0% or less or 5.0% or less, relative to the total mass of the ink composition.

Organic Solvent

In an embodiment, the ink composition may contain an organic solvent. Examples of the organic solvent include, but are not limited to, polar aprotic solvents, monoalcohols, alkyl polyols, and glycol ethers.

Exemplary polar aprotic solvents include, but are not limited to, N-methyl-2-pyrrolidone, N-hydroxyethyl-2-pyrrolidone, 2-pyrrolidone, ε-caprolactam, γ-butyrolactone, 1,3-dimethyl-2-imidazolidinone, dimethyl sulfoxide, imidazole, 1-methylimidazole, 2-methylimidazole, and 1,2-dimethylimidazole.

Exemplary monoalcohols include, but are not limited to, methanol, ethanol, n-propyl alcohol, isopropyl alcohol, n-butyl alcohol, 2-butanol, tert-butyl alcohol, isobutyl alcohol, and n-pentyl alcohol, 2-pentanol, 3-pentanol, and tert-pentyl alcohol.

Exemplary alkyl polyols include, but are not limited to, glycerin, ethylene glycol, diethylene glycol, triethylene glycol, propylene glycol (1,2-propanediol), dipropylene glycol, 1,3-propylene glycol (1,3-propanediol), isobutylene glycol (2-methyl-1,2-propanediol), 1,2-butanediol, 1,3-butanediol, 1,4-butanediol, 2-butene-1,4-diol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, 1,8-octanediol, and trimethylolpropane.

Exemplary glycol ethers include, but are not limited to, diethylene glycol mono-n-propyl ether, ethylene glycol monoisopropyl ether, diethylene glycol monoisopropyl ether, ethylene glycol mono-n-butyl ether, ethylene glycol mono-tert-butyl ether, diethylene glycol mono-n-butyl ether, triethylene glycol mono-n-butyl ether, diethylene glycol mono-tert-butyl ether, propylene glycol monomethyl ether, propylene glycol monoethyl ether, propylene glycol mono-tert-butyl ether, propylene glycol mono-n-propyl ether, propylene glycol monoisopropyl ether, propylene glycol mono-n-butyl ether, dipropylene glycol mono-n-butyl ether, dipropylene glycol mono-n-propyl ether, and dipropylene glycol monoisopropyl ether. Such organic solvents may be used individually or in combination.

The organic solvent content may be 1.0% to 70.0% relative to the total mass of the ink composition. In some embodiments, the organic solvent content may be 5.0% by mass or more, for example, 10.0% by mass or more. Also, the organic solvent content may be 50.0% by mass or less, for example, 30.0% by mass or less or 25.0% by mass or less.

Water

The ink composition disclosed herein contains water. The water may be, but is not limited to, pure water or ultra-pure water in which ionic impurities are minimized. Examples of such water include ion-exchanged water, ultrafiltered water, reverse osmosis water, and distilled water. Sterile water prepared by, for example, UV irradiation or addition of hydrogen peroxide may be used. The use of sterile water can prevent the occurrence of mold or bacteria in the ink composition during storage for a long period. Thus, the ink composition can be stably stored.

The water content may be 10.0% to 90.0% relative to the total mass of the ink composition. In some embodiments, the water content may be 40.0% by mass or more or 50.0% by mass or more. Also, the water content may be 80.0% by mass or less, for example, 70.0% by mass or less.

Surfactant

In some embodiments, the ink composition disclosed herein may contain a surfactant from the viewpoint of consistent ejection in an ink jet printing method and appropriate permeation of the ink composition. The surfactant may be, but is not limited to, an acetylene glycol-based surfactant, a fluorosurfactant, or a silicone surfactant.

Examples of the acetylene glycol-based surfactant include, but are not limited to, 2,4,7,9-tetramethyl-5-decyne-4,7-diol and alkylene oxide adducts thereof, and 2,4-dimethyl-5-decyne-4-ol and alkylene oxide adducts thereof. Such surfactants may be used individually or in combination.

The acetylene glycol-based surfactant is commercially available, and examples thereof include, but are not limited to, Olfine 104 and Olfine E1010 (both produced by Nissin Chemical Industry), and Surfynol series 104, 465, 61, and DF110D (all produced by Evonik Industries).

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxide compounds. Such surfactants may be used individually or in combination.

The fluorosurfactant is commercially available, and examples thereof include, but are not limited to, Surflon series 5144 and 5145 (both produced by AGC Seimi Chemical), Fluorad series FC-170C, FC-430, and FC4430 (all produced by 3M), FSO, FSO-100, FSN, FSN-100, and FS-300 (all produced by Dupont), and FT-250 and FT-251 (both produced by Neos). Such surfactants may be used individually or in combination.

The silicone surfactant may be, but is not limited to, a polysiloxane compound or a polyether-modified organosiloxane. Such surfactants may be used individually or in combination.

The silicone surfactant is commercially available, and examples thereof include, but are not limited to, BYK-306, BYK-307, BYK-333, BYK-341, BYK-345, BYK-346, BYK-347, BYK-348, and BYK-349 (all produced by BYK Additives & Instruments); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all produced by Shin-Etsu Chemical).

The surfactants cited above may be used individually or in combination. In some embodiments, acetylene glycol-based surfactants are beneficially used.

The surfactant content in the ink composition may be 0.1% to 5.0%, for example, 0.2% to 3.0% or 0.2% to 1.0%, relative to the total mass of the ink composition.

The ink composition disclosed herein may further contain other constituents as additives, for example, a pH adjuster, such as potassium hydroxide, triethanolamine, or isopropanol amine, other resin particles, a solubilizing agent, a viscosity modifier, an antioxidant, a preservative/fungicide, a fungicide, a corrosion inhibitor, and a chelating agent capable of trapping metal ions that affects dispersion, such as sodium ethylenediaminetetraacetate.

Ink Jet Printing Method

The ink jet printing method disclosed herein includes an ink application step of applying an ink composition according to an embodiment of the present disclosure onto a printing medium by ejecting the ink composition from an ink jet head. Such an ink jet printing method can provide a low wet friction and a high resistance to marker rubbing for the printed item while producing a high color development.

The printing medium is not particularly limited and may be absorbent or not absorbent. The ink jet printing method can be used for printing on various types of printing medium, from non-absorbent printing media into which water-soluble ink compositions cannot permeate easily to absorbent printing media into which water-soluble ink compositions penetrate easily.

The term "absorbent printing medium" used herein refers to a printing medium capable of absorbing ink compositions. The term "non-absorbent printing medium" used herein refers to a printing medium that hardly absorbs or does not absorb ink compositions. Quantitatively, the absorbent printing medium is a medium exhibiting a water absorption of more than 10 mL/m$^2$ for a period of 30 ms$^{1/2}$ from the beginning of contact with water, measured by Bristow's method. In contrast, such a water absorption of non-absorbent media is 10 mL/m² or less. Details of Bristow's method are specified in Standard No. 51 (Paper and Paperboard—Liquid Absorption Test Method—Bristow's Method (in Japanese)) of JAPAN TAPPI Paper and Pulp Test Methods edited in 2000 (in Japanese).

Absorbent printing media include, but are not limited to, plain paper such as electrophotographic paper having high ink permeability, ink jet paper having an ink absorbing layer containing silica particles or alumina particles or an ink absorbing layer made of a hydrophilic polymer such as polyvinyl alcohol (PVA) or polyvinyl pyrrolidone (PVP), and paper having relatively low ink permeability used for ordinary offset printing, such as art paper, coat paper, and cast-coated paper.

Non-absorbent printing media include, but are not limited to, plastic films or plates, such as those of polyvinyl chloride, polyethylene, polypropylene, and polyethylene terephthalate (PET); metal plates, such as those of iron, silver, copper, and aluminum, and metal-coated plates or films formed by vapor-depositing such a metal on a metal plate or plastic film; and alloy plates, such as those of stainless steel and brass.

In the ink application step, the ink composition may be ejected at an application amount of 3.6 mg/inch² or more. Since the ink jet printing method uses the ink composition of an embodiment of the present disclosure, high color development can be achieved. Consequently, the printed item has a sufficient optical density in spite of such an ink ejection amount and, hence, the amount of ink composition to be used for printing can be reduced to reduce environmental load. In some embodiments, the ink ejection amount may be 6.0 mg/inch² or less, for example, 5.0 mg/inch² or less, 4.5 mg/inch² or less, or 4.0 mg/inch² or less. When the ink composition is ejected at an amount in such a range, the printed image or graphic has a sufficient optical density, whereas the amount of ink used in the ink jet printing method is reduced.

The ink jet printing method may further include a heating step of heating the printing medium to help dry the ink composition at a time before, during, or after printing operation or throughout the printing operation. The heating device used for the heating step may be, but is not limited to, a device capable of temperature control, and such heating devices include a radiation type sheathed heater, infrared radiation heater, a contact type sheet heater, and an electromagnetic wave heater. The surface temperature of the heated printing medium may be 40° C. to 80° C. The ink jet printing method may further include an air blowing step using a fan or the like.

The ink jet printing method disclosed herein may further include any other known steps that may be used in the known ink jet printing method.

EXAMPLES

The subject matter of the present disclosure will be further described in detail with reference to Examples and Comparative Examples. However, the implementation of the concept of the present disclosure is not limited to the following Examples.

Examples 1 to 15, Comparative Examples 1 to 4
(Preparation of Ink Compositions 1 to 15 and 51 to 54)

Preparation of Ink Compositions

Constituents were mixed in the proportions presented in Tables 1 to 4 and sufficiently stirred. Each of the ink compositions was thus prepared. More specifically, the constituents were uniformly dispersed in the mixture, followed by removing impurities through a membrane filter of 5 μm in pore size. The resulting ink compositions were evaluated as described below. The evaluation results are presented in Tables 1 to 4.

Evaluation

Color Development

Each ink composition was introduced into an ink cartridge of an ink jet printer PX-S840 (manufactured by Seiko Epson). A4 (210 mm×297 mm) sheets of copy paper "Xerox P" (manufactured by Fuji Xerox, having a basis weight of 64 g/m² and a thickness of 88 μm) were prepared as printing media. A 204 mm×291 mm solid pattern was printed on the printing medium at a print duty of 100% and an ink application amount of 4.5 mg/inch² under the conditions of 25° C. in temperature and 50% in relative humidity. After printing, the optical density (OD value) of the printed pattern was measured with a colorimeter Xrite i1 (manufactured by Xrite), and the color development was evaluated according to the criteria presented below. The ink application amount was calculated by using the following equation:

Ink application amount (mg/inch²)=(mass (mg) of the printing medium after printing−mass (mg) of the printing medium before printing)/printed area (inch²)

Criteria
A: OD value was 1.3 or more.
B: OD value was 1.2 to less than 1.3.
C: OD value was less than 1.2.

Resistance to Marker Rubbing

Each ink composition was introduced into an ink cartridge of an ink jet printer PX-S840 (manufactured by Seiko Epson), and a character pattern was printed on the printing medium under the conditions of 25° C. in temperature and 50% in relative humidity. A4 (210 mm×297 mm) sheets of copy paper "Xerox P" (manufactured by Fuji Xerox, having a basis weight of 64 g/m² and a thickness of 88 μm) were used as printing media. One hour after printing, the characters of the printed pattern were rubbed with a maker pen OPTEX CARE (manufactured by ZEBRA), and the degree of ink bleeding was rated according to the following criteria:
A: No bleeding at the rubbed portion.
B: Some bleeding occurred at the rubbed portion but was obscure.
C: Noticeable bleeding occurred at the rubbed portion.

Wet Friction

The printed item prepared for the above-described color development test was fixed to a horizontal flat surface immediately after the solid pattern (204 mm×291 mm) was printed. The solid pattern side of the printed item was directly covered with an A4 (210 mm×297 mm) virgin copy paper sheet Xerox P, and onto which a weight of 50 g was loaded. The horizontal flat surface was sloped until the copy paper sheet started moving, and the angle at this time was measured for the evaluation of wet friction. It was determined that the smaller the angle, the lower the wet friction. The evaluation criteria were as follows:

Criteria
A: The angle was less than 37°.
B: The angle was less than 44°.
C: The angle was 44° or more.

Recovery from Clogging

Each ink composition was introduced into an ink cartridge of an ink jet printer PX-S840 (manufactured by Seiko Epson) and was allowed to stand in an environment of 40° C. in temperature and 20% in relative humidity with the cap removed. Then, the nozzles were subjected to cleaning several times until all the nozzles were recovered. The number of times of cleaning was counted.
A: less than 6 times of cleaning
B: 6 times to less than 9 times of cleaning
C: 9 times or more of cleaning

TABLE 1

|  |  |  | Example 1 | Example 2 | Example 3 | Example 4 | Example 5 |
|---|---|---|---|---|---|---|---|
| Ink composition No. |  |  | 1 | 2 | 3 | 4 | 5 |
| Ink composition | Pigment particles *1 | Aqua-Black | 7.0 | 7.0 | 7.0 | 7.0 | — |
|  |  | MA100 | — | — | — | — | 7.0 |
|  | Inorganic oxide particles *1 | SI-30 | — | — | — | — | — |
|  |  | SI-45P | 7.0 | — | — | — | — |
|  |  | ST-CM | — | — | 7.0 | — | 7.0 |
|  |  | ST-30L | — | 7.0 | — | — | — |
|  |  | ST-ZL | — | — | — | 7.0 | — |
|  |  | MP-1040 | — | — | — | — | — |
|  | Resin particles *1 | Superflex 420 | 1.0 | 1.0 | 1.0 | 1.0 | 1.0 |
|  |  | Superflex 210 | — | — | — | — | — |
|  |  | Superflex 500M | — | — | — | — | — |
|  |  | Superflex 620 | — | — | — | — | — |
|  |  | X-436 | — | — | — | — | — |
|  |  | QE-1042 | — | — | — | — | — |
|  | Organic solvent | 2-P | 5.0 | 5.0 | 5.0 | 5.0 | 5.0 |
|  |  | Glycerin | 8.5 | 8.5 | 8.5 | 8.5 | 9.5 |
|  |  | TEGmBE | 2.0 | 2.0 | 2.0 | 2.0 | 2.0 |
|  | Surfactant | Olfine E1010 | 0.5 | 0.5 | 0.5 | 0.5 | 0.5 |
|  |  | Surfynol 104 | 0.5 | 0.5 | 0.5 | 0.5 | 0.5 |
|  | Alkali | TIPA | 0.5 | 0.5 | 0.5 | 0.5 | 0.5 |
|  | Water | Pure water | Balance | Balance | Balance | Balance | Balance |
| Relationship (1) | $D_{50}$ of resin particles (nm) |  | 10 | 10 | 10 | 10 | 10 |
|  | $D_{50}$ of inorganic oxide particles (nm) |  | 45 | 45 | 20 | 80 | 20 |
|  | $D_{50}$ of pigment particles (nm) |  | 110 | 110 | 110 | 110 | 24 |
|  | Satisfy relationship (1)? |  | Yes | Yes | Yes | Yes | Yes |
| Results | Color development |  | A | A | A | A | B |
|  | Resistance to marker rubbing |  | A | A | A | B | A |
|  | Wet friction |  | A | A | A | A | A |
|  | Recovery from clogging |  | A | A | B | A | A |

*1: Solid content

TABLE 2

|  |  |  | Example 6 | Example 7 | Example 8 | Example 9 | Example 10 |
|---|---|---|---|---|---|---|---|
| Ink composition No. |  |  | 6 | 7 | 8 | 9 | 10 |
| Ink composition | Pigment particles *1 | Aqua-Black | 7.0 | 7.0 | 7.0 | 7.0 | 7.0 |
|  |  | MA100 | — | — | — | — | — |
|  | Inorganic oxide particles *1 | SI-30 | — | — | — | — | — |
|  |  | SI-45P | 7.0 | 7.0 | 10.0 | 1.0 | 7.0 |
|  |  | ST-CM | — | — | — | — | — |
|  |  | ST-30L | — | — | — | — | — |
|  |  | ST-ZL | — | — | — | — | — |
|  |  | MP-1040 | — | — | — | — | — |
|  | Resin particles *1 | Superflex 420 | — | — | 1.0 | 1.0 | 5.0 |
|  |  | Superflex 210 | — | 1.0 | — | — | — |
|  |  | Superflex 500M | — | — | — | — | — |
|  |  | Superflex 620 | — | — | — | — | — |
|  |  | X-436 | — | — | — | — | — |
|  |  | QE-1042 | 1.0 | — | — | — | — |
|  | Organic solvent | 2-P | 5.0 | 5.0 | 5.0 | 5.0 | 5.0 |
|  |  | Glycerin | 9.5 | 11.5 | 1.5 | 24.5 | 17.5 |
|  |  | TEGmBE | 2.0 | 2.0 | 2.0 | 2.0 | 2.0 |
|  | Surfactant | Olfine E1010 | 0.5 | 0.5 | 0.5 | 0.5 | 0.5 |
|  |  | Surfynol 104 | 0.5 | 0.5 | 0.5 | 0.5 | 0.5 |
|  | Alkali | TIPA | 0.5 | 0.5 | 0.5 | 0.5 | 0.5 |
|  | Water | Pure water | Balance | Balance | Balance | Balance | Balance |
| Relationship (1) | $D_{50}$ of resin particles (nm) |  | 40 | 40 | 10 | 10 | 10 |
|  | $D_{50}$ of inorganic oxide particles (nm) |  | 45 | 45 | 45 | 45 | 45 |
|  | $D_{50}$ of pigment particles (nm) |  | 110 | 110 | 110 | 110 | 110 |
|  | Satisfy relationship (1)? |  | Yes | Yes | Yes | Yes | Yes |
| Results | Color development |  | A | A | A | B | A |
|  | Resistance to marker rubbing |  | A | B | A | A | A |
|  | Wet friction |  | A | A | A | B | A |
|  | Recovery from clogging |  | A | A | B | A | B |

*1: Solid content

TABLE 3

|  |  |  | Example 11 | Example 12 | Example 13 | Example 14 | Example 15 |
|---|---|---|---|---|---|---|---|
| Ink composition No. |  |  | 11 | 12 | 13 | 14 | 15 |
| Ink composition | Pigment particles *1 | Aqua-Black | 7.0 | 7.0 | 7.0 | 7.0 | 7.0 |
|  |  | MA100 | — | — | — | — | — |
|  | Inorganic oxide particles *1 | SI-30 | — | — | 7.0 | — | — |
|  |  | SI-45P | 7.0 | 7.0 | — | — | — |
|  |  | ST-CM | — | — | — | — | — |
|  |  | ST-30L | — | — | — | — | — |
|  |  | ST-ZL | — | — | — | — | 7.0 |
|  |  | MP-1040 | — | — | — | 7.0 | — |
|  | Resin particles *1 | Superflex 420 | 0.1 | — | 1.0 | 1.0 | — |
|  |  | Superflex 210 | — | — | — | — | — |
|  |  | Superflex 500M | — | — | — | — | — |
|  |  | Superflex 620 | — | 1.0 | — | — | — |
|  |  | X-436 | — | — | — | — | 1.0 |
|  |  | QE-1042 | — | — | — | — | — |
|  | Organic solvent | 2-P | 5.0 | 5.0 | 5.0 | 5.0 | 5.0 |
|  |  | Glycerin | 11.4 | 8.5 | 8.5 | 8.5 | 11.5 |
|  |  | TEGmBE | 2.0 | 2.0 | 2.0 | 2.0 | 2.0 |
|  | Surfactant | Olfine E1010 | 0.5 | 0.5 | 0.5 | 0.5 | 0.5 |
|  |  | Surfynol 104 | 0.5 | 0.5 | 0.5 | 0.5 | 0.5 |
|  | Alkali | TIPA | 0.5 | 0.5 | 0.5 | 0.5 | 0.5 |
|  | Water | Pure water | Balance | Balance | Balance | Balance | Balance |
| Relationship (1) | $D_{50}$ of resin particles (nm) |  | 10 | 20 | 10 | 10 | 40 |
|  | $D_{50}$ of inorganic oxide particles (nm) |  | 45 | 45 | 11 | 100 | 80 |
|  | $D_{50}$ of pigment particles (nm) |  | 110 | 110 | 110 | 110 | 110 |
|  | Satisfy relationship (1)? |  | Yes | Yes | Yes | Yes | Yes |
| Results | Color development |  | A | A | B | A | A |
|  | Resistance to marker rubbing |  | B | B | A | A | B |
|  | Wet friction |  | A | A | A | B | A |
|  | Recovery from clogging |  | A | A | A | A | A |

*1: Solid content

TABLE 4

|  |  |  | Comparative Example 1 | Comparative Example 2 | Comparative Example 3 | Comparative Example 4 |
|---|---|---|---|---|---|---|
| Ink composition No. |  |  | 51 | 52 | 53 | 54 |
| Ink composition | Pigment particles *1 | Aqua-Black | 7.0 | 7.0 | 7.0 | 7.0 |
|  |  | MA100 | — | — | — | — |
|  | Inorganic oxide particles *1 | SI-30 | — | — | — | — |
|  |  | SI-45P | — | 7.0 | 0.9 | 7.0 |
|  |  | ST-CM | — | — | — | — |
|  |  | ST-30L | — | — | — | — |
|  |  | ST-ZL | — | — | — | — |
|  |  | MP-1040 | — | — | — | — |
|  | Resin particles *1 | Superflex 420 | 1.0 | — | 1.0 | — |
|  |  | Superflex 210 | — | — | — | — |
|  |  | Superflex 500M | — | 1.0 | — | — |
|  |  | Superflex 620 | — | — | — | — |
|  |  | X-436 | — | — | — | — |
|  |  | QE-1042 | — | — | — | — |
|  | Organic solvent | 2-P | 5.0 | 5.0 | 5.0 | 5.0 |
|  |  | Glycerin | 15.5 | 6.5 | 41.6 | 9.5 |
|  |  | TEGmBE | 2.0 | 2.0 | 2.0 | 2.0 |
|  | Surfactant | Olfine E1010 | 0.5 | 0.5 | 0.5 | 0.5 |
|  |  | Surfynol 104 | 0.5 | 0.5 | 0.5 | 0.5 |
|  | Alkali | TIPA | 0.5 | 0.5 | 0.5 | 0.5 |
|  | Water | Pure water | Balance | Balance | Balance | Balance |
| Relationship (1) | $D_{50}$ of resin particles (nm) |  | 10 | 140 | 10 | — |
|  | $D_{50}$ of inorganic oxide particles (nm) |  | — | 45 | 45 | 45 |
|  | $D_{50}$ of pigment particles (nm) |  | — | 110 | 110 | 110 |
|  | Satisfy relationship (1)? |  | — | No | Yes | — |
| Results | Color development |  | C | A | C | A |
|  | Resistance to marker rubbing |  | B | C | A | C |
|  | Wet friction |  | C | A | C | A |
|  | Recovery from clogging |  | A | A | A | A |

*1: Solid content

The constituents used in the ink compositions are as follows:

Aqua-Black: Self-dispersible carbon black Aqua-Black 162 ($D_{50}$: 110 nm, produced by Tokai Carbon)

MA100: Carbon black MA100 ($D_{50}$: 24 nm, produced by Mitsubishi Chemical)

SI-30: Silica sol SI-30P ($D_{50}$: 12 nm, solid content: 40% by mass, produced by JGC Catalysts & Chemicals)

SI-45: Silica sol SI-45P ($D_{50}$: 45 nm, solid content: 40% by mass, produced by JGC Catalysts & Chemicals)

ST-CM: Silica sol ST-CM ($D_{50}$: 20 nm, solid content: 30% by mass, produced by Nissan Chemical Industries)

ST-30L: Silica sol ST-30L ($D_{50}$: 45 nm, solid content: 30% by mass, produced by Nissan Chemical Industries)

ST-ZL: Silica sol ST-ZL ($D_{50}$: 80 nm, solid content: 30% by mass, produced by Nissan Chemical Industries)

MP-1040: Silica sol MP-1040 ($D_{50}$: 100 nm, solid content: 40% by mass, produced by Nissan Chemical Industries)

Superflex 420: Urethane resin particles Superflex 420 ($D_{50}$: 10 nm, MFT: 20° C., produced by Dai-ichi Kogyo Seiyaku)

Superflex 210: Urethane resin particles Superflex 210 ($D_{50}$: 40 nm, MFT: 23° C., produced by Dai-ichi Kogyo Seiyaku)

Superflex 500M: Urethane resin particles Superflex 500M ($D_{50}$: 140 nm, MFT: 5° C., produced by Dai-ichi Kogyo Seiyaku)

Superflex 620: Urethane resin particles Superflex 620 ($D_{50}$: 20 nm, MFT: 30° C., produced by Dai-ichi Kogyo Seiyaku)

X-436: Styrene-acrylic resin particles X-436 ($D_{50}$: 40 nm, MFT: 5° C., produced by Seiko PMC Corporation)

QE-1042: Styrene-acrylic resin particles QE-1042 ($D_{50}$: 40 nm, MFT: 45° C., produced by Seiko PMC Corporation)

2-P: 2-Pyrrolidone

ε-C: ε-Caprolactam

TEGmBE: Triethylene glycol monobutyl ether

Olfine E1010: Acetylene glycol-based surfactant Olfine E1010 (produced by Nissin Chemical Industry)

Surfynol 104: Acetylene glycol-based surfactant Surfynol 104 (produced by Evonik Industries)

TIPA: Tripropanolamine

EXAMPLE 16

A solid pattern was printed with ink composition 1 prepared in Example 1 in the same manner as the solid pattern prepared for the color development test except for the ink application amount, and the optical density (OD value) of the printed pattern was measured with a colorimeter Xrite i1 (manufactured by Xrite). The minimum ink application amount at which the OD value came to 1.2 or more was 3.6 mg/inch².

The results of the Examples and Comparative Examples show that the ink compositions and the ink jet printing method disclosed herein produced printed items having satisfactory resistance to marker rubbing while achieving high color development.

The comparison between Example 1 and Comparative Example 1 suggests that the ink composition disclosed herein containing inorganic oxide particles and satisfying specific conditions and the ink jet printing method disclosed herein using such an ink composition can provide high color development and a reduced wet friction.

The comparison between Example 1 and Comparative Example 2 suggests that the ink composition disclosed herein containing pigment particles, inorganic oxide particles, and resin particles and satisfying relationship (1) and the ink jet printing method disclosed herein using such an ink composition can provide an increased resistance to marker rubbing.

The comparison between Example 1 and Comparative Example 3 suggests that the ink composition disclosed herein containing 1.0% or more of inorganic oxide particles relative to the total mass of the ink composition and the ink jet printing method disclosed herein using such an ink composition can provide high color development and a reduced wet friction for the printed item.

The comparison between Example 1 and Comparative Example 4 suggests that the ink composition disclosed herein containing resin particles and satisfying specific conditions and the ink jet printing method disclosed herein using such an ink composition can provide an increased resistance to marker rubbing.

The results of Examples 1 and 2 suggest that, even if different inorganic oxide particles are used, the ink composition and the ink jet printing method disclosed herein can provide a reduced wet friction and an increased resistance to marker rubbing for the printed item while achieving high color development, provided that the ink composition satisfies specific conditions.

The results of Examples 1, 3, 4, 13 and 14 suggest that even if the $D_{50}$ of the inorganic oxide particles in the ink composition is 11 nm to 100 nm, the ink composition and the ink jet printing method disclosed herein can provide a reduced wet friction and an increased resistance to marker rubbing for the printed item while achieving high color development, provided that the ink composition satisfies specific conditions.

The comparison between Examples 1 and 5 suggests that even if the pigment particles and the inorganic oxide particles have relatively small $D_{50}$ sizes, the ink composition and the ink jet printing method disclosed herein can provide a reduced wet friction and an increased resistance to marker rubbing for the printed item while achieving high color development, provided that the ink composition satisfies specific conditions.

The results of Examples 1, 6, and 7 suggest that even if various types of resin particles are used, the ink composition and the ink jet printing method disclosed herein can provide a reduced wet friction and an increased resistance to marker rubbing for the printed item while achieving high color development, provided that the ink composition satisfies specific conditions.

The results of Examples 1, 8, and 9 suggest that the ink composition disclosed herein containing 1.0% to 10.0% of inorganic oxide particles relative to the ink composition and satisfying specific conditions and the ink jet printing method disclosed herein using such an ink composition can provide a reduced wet friction and an increased resistance to marker rubbing for the printed item while achieving high color development.

Also, the results of Examples 1, 10, and 11 suggest that the ink composition disclosed herein containing 0.1% to 5.0% of inorganic oxide particles relative to the total mass of the ink composition and satisfying specific conditions and the ink jet printing method disclosed herein using such an ink composition can provide a reduced wet friction and an increased resistance to marker rubbing for the printed item while achieving high color development.

The comparison between Example 1 and Example 12 suggests that the ink composition and the ink jet printing method disclosed herein can provide significantly increased resistance to marker rubbing when the ink composition contains resin particles having a minimum film forming temperature of 25° C. or less and satisfies specific conditions.

What is claimed is:

1. An aqueous ink jet ink composition comprising:
   pigment particles;
   1.0% to 10.0% of inorganic oxide particles relative to the total mass of the ink composition; and
   resin particles,
   wherein the ink composition satisfies the following relationship:
   $D_{50}$ of the resin particles $\leq D_{50}$ of the inorganic oxide particles $\leq D_{50}$ of the pigment particles,
   wherein $D_{50}$ represents the volume median diameter of the corresponding particles.

2. The ink composition according to claim 1, wherein the $D_{50}$ of the inorganic oxide particles is 11 nm to 100 nm.

3. The ink composition according to claim 1, wherein the inorganic oxide particles are silica particles.

4. The ink composition according to claim 1, wherein the resin particles have a minimum film forming temperature of 25° C. or less.

5. The ink composition according to claim 1, wherein the $D_{50}$ of the resin particles is 10 nm to 140 nm.

6. The ink composition according to claim 1, wherein the content of the resin particles is 0.1% to 5.0% relative to the total mass of the ink composition.

7. An ink jet printing method comprising:
   an ink application step of applying the ink composition as set forth in claim 1 onto a printing medium by ejecting the ink composition from an ink jet head.

8. The ink jet printing method according to claim 7, wherein
   the ink composition is applied at an application amount of 3.6 mg/inch$^2$ or more in the ink application step.

9. The ink composition according to claim 1, wherein the resin particles consist of at least one material selected from the group consisting of a urethane resin, an acrylic resin, and a styrene-acrylic resin.

* * * * *